(12) United States Patent
Lee et al.

(10) Patent No.: US 9,147,243 B2
(45) Date of Patent: Sep. 29, 2015

(54) METHOD AND APPARATUS FOR MAPPING IMAGE INFORMATION OF TARGET OBJECT ONTO INTERFACE OF THE TARGET OBJECT IN MAGNETIC RESONANCE IMAGING

(71) Applicants: Samsung Electronics Co., Ltd., Gyeonggi-do (KR); Industry-University Cooperation Foundation Hanyang University, Seoul (KR)

(72) Inventors: Jong-min Lee, Seoul (KR); Oh-hun Kwon, Chungcheongnam-do (KR); Hei-soog Kim, Gyeonggi-do (KR); Hyug-rae Cho, Seoul (KR)

(73) Assignees: Samsung Electronics Co., Ltd., Yeongtong-gu, Suwon-si, Gyeonggi-do (KR); Industry-University Cooperation Foundation Hanyang University, Seongdong-gu, Seoul (KR)

( * ) Notice: Subject to any disclaimer, the term of this patent is extended or adjusted under 35 U.S.C. 154(b) by 134 days.

(21) Appl. No.: 13/955,589

(22) Filed: Jul. 31, 2013

(65) Prior Publication Data

US 2014/0177933 A1 Jun. 26, 2014

(30) Foreign Application Priority Data

Dec. 21, 2012 (KR) ........................ 10-2012-0150938

(51) Int. Cl.
 *G06K 9/00* (2006.01)
 *A61B 5/05* (2006.01)
 *G06T 7/00* (2006.01)
(52) U.S. Cl.
 CPC ..... *G06T 7/0012* (2013.01); *G06T 2207/10092* (2013.01); *G06T 2207/30016* (2013.01)

(58) Field of Classification Search
None
See application file for complete search history.

(56) References Cited

U.S. PATENT DOCUMENTS

| | | | |
|---|---|---|---|
| 5,795,296 A | 8/1998 | Pathak et al. | |
| 6,549,803 B1* | 4/2003 | Raghavan et al. | 600/431 |
| 6,591,004 B1* | 7/2003 | VanEssen et al. | 382/154 |
| 2010/0215239 A1 | 8/2010 | Assaf | |
| 2011/0199084 A1* | 8/2011 | Hasan | 324/309 |

FOREIGN PATENT DOCUMENTS

| | | |
|---|---|---|
| JP | 2008-513087 A | 5/2008 |
| JP | 2010-253176 A | 11/2010 |
| JP | 2011-139799 A | 7/2011 |

OTHER PUBLICATIONS

SM Smith, M Jenkinson, MW Woolrich, et al. "Advances in Functional and Structural MR Image Analysis and Implementation as FSL ", University of Oxford, FMRIB Analysis Group Technical Reports, TR04SS2, 2004.*

(Continued)

*Primary Examiner* — Matthew Bella
*Assistant Examiner* — Soo Shin
(74) *Attorney, Agent, or Firm* — Cha & Reiter, LLC

(57) ABSTRACT

A method and an apparatus map image information of a target object onto an interface of the target object in magnetic resonance imaging (MRI). The method includes obtaining the image information of the target object in a predetermined direction from the outside of the target object to the inside of the target object, analyzing the obtained image information, extracting one piece of the obtained image information based on the analysis result, and allotting the extracted image information onto the interface of the target object.

13 Claims, 11 Drawing Sheets

(56) References Cited

OTHER PUBLICATIONS

Desai et al, "Volumetric vs. surface-based alignment for localization of auditory cortex activation", NeuroImage, Elsevier Inc., Mar. 10, 2005.

Ray et al, "Mild Cognitive Impairment: Apparent Diffusion Coefficient in Regional Gray Matter and White Matter Structures", Radiology: vol. 421: No. 1, Nov. 17, 2005.

Jezzard et al, "Correction for Geometric Distortion in Echo Planar Images from B0 Field Variations", Mar. 21, 1995, Williams & Wilkins.

Turken et al, "Multimodal surface-based morphometry reveals diffuse cortical atrophy in traumatic brain injury", BioMed Central, Dec. 31, 2009, BMC Medical Imaging.

Villain et al, "A Simple Way to Improve Anatomical Mapping of Functional Brain Imaging", Experimental Laboratory Research, Jan. 1, 2010, American Society of Neuroimaging.

\* cited by examiner

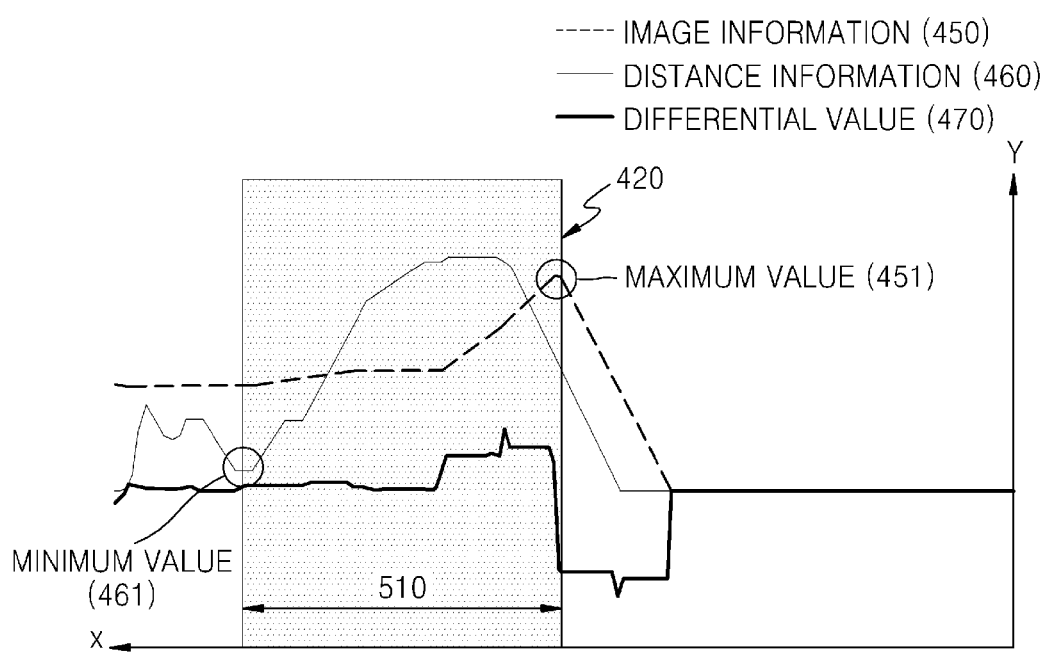

METHOD AND APPARATUS FOR MAPPING IMAGE INFORMATION OF TARGET OBJECT ONTO INTERFACE OF THE TARGET OBJECT IN MAGNETIC RESONANCE IMAGING

CLAIM OF PRIORITY

This application claims, pursuant to 35 U.S.C. 119(a), priority to and the benefit of the earlier filing date of Korean Patent Application No. 10-2012-0150938, filed on Dec. 21, 2012, in the Korean Intellectual Property Office, the disclosure of which is incorporated herein in its entirety by reference.

BACKGROUND

1. Field of the Invention

The present disclosure relates to magnetic resonance imaging (MRI), and more particularly to a method and an apparatus for mapping image information of a target object onto an interface of the target object in magnetic resonance imaging (MRI).

2. Description of the Related Art

Magnetic resonance imaging (MRI) is a technology which involves positioning a target object in a space formed by a large magnet that generates a magnetic field, generating a radio frequency (RF) pulse to have protons included in the target object resonate, measuring differences in signals generated by tissues included in the target object, and reconstructing the measured differences through a computer to obtain an image of the target object.

The MRI has higher resolution and contrast than those of other imaging methods, for example, methods that use ultrasonic waves, and may provide a deep organ image and three-dimensional information in real time. In addition, in the MRI, the target object is not exposed to radiation. Therefore, the MRI is harmless to a human body and may obtain axial, sagittal, and coronal images without changing the position of the target object.

SUMMARY

The present invention provides a method and an apparatus for mapping image information of a target object onto an interface of the target object in magnetic resonance imaging (MRI).

According to an aspect of the present invention, there is provided a method of mapping image information of a target object onto an interface of the target object in magnetic resonance imaging (MRI). The method may include obtaining the image information of the target object in a predetermined direction from the outside of the target object to the inside of the target object, analyzing the obtained image information, extracting one piece of the obtained image information based on the analysis result, and allotting the extracted image information onto the interface of the target object.

The image information of the target object may include mean diffusivity (MD) information obtained from diffusion tensor imaging (DTI) of the target object.

The image obtained using MRI may include an external interface and an internal interface of the target object.

The predetermined direction may include a path connected between a predetermined point on the external interface and a point on the internal interface corresponding to the predetermined point on the external interface.

Obtaining the image information of the target object may further include obtaining distance information of tissues included in the target object, detecting a first position on a path adjacent to the external interface and corresponding to a maximum value of the image information, detecting a second position on the path adjacent to the external interface and corresponding to a minimum value of the distance information, and obtaining a predetermined position range between the first position and the second position.

The distance information may represent a distance from a reference point on at least one tissue included in the target object to another tissue.

Analyzing the obtained image information may further include obtaining differential values for the obtained image information, detecting a third position on the path corresponding to a maximum differential value among the obtained differential values, and resetting the third position as an external interface of the target object.

The third position may be included in the predetermined position range.

Extracting one piece of the obtained image information based on the analysis result may include extracting image information corresponding to a fourth position separated from the third position by a predetermined distance in the predetermined position range.

Allotting the extracted image information onto the interface of the target object may include generating an intermediate interface of the target object to correspond to the fourth position and allotting the extracted image information onto the intermediate interface.

The intermediate interface may be positioned between the reset external interface and the internal interface.

According to another aspect of the present invention, there is provided an apparatus for mapping image information of a target object onto an interface of the target object in MRI. The apparatus may include an information obtaining unit for obtaining the image information of the target object in a predetermined direction from the outside of the target object to the inside of the target object, an information analyzing unit for analyzing the obtained image information, an information extracting unit for extracting one piece of the obtained image information based on the analysis result, and an information allotting unit for allotting the extracted image information onto the interface of the target object.

The image information of the target object may include MD information obtained from DTI of the target object.

The image obtained from MRI may include an external interface and an internal interface of the target object.

The predetermined direction may include a path connected between a predetermined point on the external interface and a point on the internal interface corresponding to the predetermined point on the external interface.

The information obtaining unit may include a distance information obtaining unit for obtaining distance information of tissues included in the target object, a position detecting unit for detecting a first position on a path adjacent to the external interface and corresponding to a maximum value of the image information and a second position on the path adjacent to the external interface and corresponding to a minimum value of the distance information, and a position range obtaining unit for obtaining a predetermined position range between the first position and the second position.

The distance information may represent a distance from a reference point on at least one tissue included in the target object to another tissue.

The information analyzing unit may include a differential value obtaining unit for obtaining differential values for the obtained image information and an interface resetting unit for resetting a third position on the path corresponding to a maximum differential value among the obtained differential values as the external interface of the target object.

The third position may be included in the predetermined position range and may be detected by the position detecting unit.

The information extracting unit may extract image information corresponding to a fourth position separated from the third position by a predetermined distance in the predetermined position range.

The information allotting unit may further include an intermediate interface generating unit for generating an intermediate interface of the target object to correspond to the fourth position.

The information allotting unit may allot the extracted image information onto the intermediate interface.

The intermediate interface may be positioned between the reset external interface and the internal interface.

A computer readable recording medium in which a program for executing the above-described method by a computer is recorded may be provided.

BRIEF DESCRIPTION OF THE DRAWINGS

The above and other features and advantages of the present invention will become more apparent by describing in detail exemplary embodiments thereof with reference to the attached drawings in which:

FIGS. 5A, 5B and 5C illustrate an example of a method of obtaining a predetermined position range according to the exemplary embodiment of the present invention;

DETAILED DESCRIPTION

Figure 1:
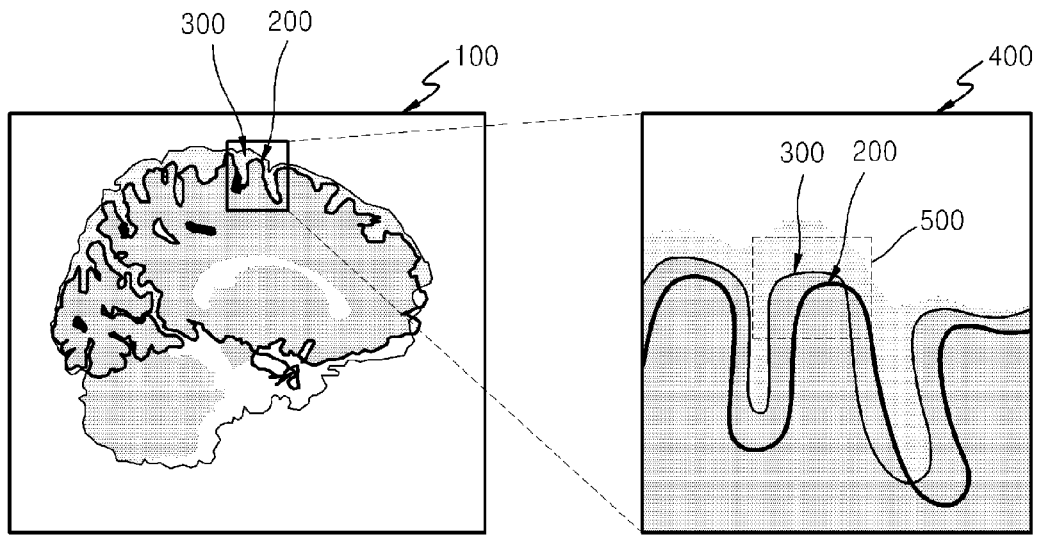
FIG. 1 illustrates an example of a surface based image analyzing method of the prior art.

Terms used in the present specification will be briefly described and the present invention will be described in detail.

The terms used in the present invention are selected from common terms currently and widely used in consideration of the functions in the present invention. However, the terms may vary with the intentions of those skilled in the art, precedents, and appearances of new technologies. In addition, there are some terms arbitrarily selected by the applicant. In this case, the meanings of the terms will be described in detail in the following detailed description of the invention. Therefore, the terms used in the present invention are not simply defined by the terms themselves but are defined by the meanings of the terms and the entire content and context of the present invention.

When a part "includes" an element, in the entire specification herein, unless described to the contrary, the term "includes" does not indicate that another element is excluded but instead indicates that the other element may be further included. In addition, the terms including "unit" and "module" described in the specification refer to units of performing at least one function or operation, which may be implemented by hardware or software executed by hardware, or by a combination of hardware and software.

Hereinafter, the exemplary embodiments of the present invention will be described in detail with reference to the accompanying drawings so that those skilled in the art may easily perform the present invention. However, the present invention may be implemented by various modifications and is not limited to the exemplary embodiments described herein. In the drawings, in order to clarify the present invention, parts that are not related to description are omitted and like reference numerals represent like elements throughout the specification.

In the following description, a detailed explanation of known related functions and constructions may be omitted to avoid unnecessarily obscuring the subject matter of the present invention. Furthermore, although the drawings represent exemplary embodiments of the invention, the drawings are not necessarily to scale and certain features may be exaggerated or omitted in order to more clearly illustrate and explain the present invention.

In the entire specification herein, magnetic resonance imaging (MRI) refers to capturing an image of a target object obtained by a magnetic resonance (MR) and/or a nuclear magnetic resonance (NMR) principle.

A target object according to an exemplary embodiment of the present invention may include a part of a human body, for example, organs such as a liver, a heart, a womb, a brain, a breast, and an abdomen.

In addition, the target object according to the exemplary embodiment of the present invention may include a phantom. The phantom refers to a material having a very similar volume, density, and physical characteristics such as atomic numbers of elements and molecules in portions of a living thing, such as tissues. The phantom according to the exemplary embodiment of the present invention may include a spherical water phantom having similar characteristics to those of portions of a human body.

The human cerebral cortex in which nerve cell bodies are gathered may perform very important functions such as a sensory function and a motor function. In order to analyze a microscopic change in the cerebral cortex, research using mean diffusivity (MD) information obtained through diffusion MRI is being actively performed.

Diffusion MRI may refer to an image method that represents tissue distribution of a target object using anisotropy and directional properties in which water molecules included in the target object are diffused in a uniform direction. For example, the diffusion MRI may include an image that represents the structure of a brain tissue using the motility and directional property of the water molecules included in the brain in a magnetic field.

In order to analyze a microscopic change in the cerebral cortex, a volume based analyzing method and a surface based analyzing method may be used.

The volume based analyzing method may include a region of interest (ROI) based analysis and a voxel based morphometry (VBM) analysis.

The ROI based analysis includes a process of manually selecting a ROI of a target object by a user so that the ROI based analysis is very highly dependent on the user and that analysis accuracy of an image may vary with a skill of the user.

The VBM analysis for investigating a pathological difference between local regions in a brain image field has a problem in that an analysis result of an image may vary with a registration success ratio. That is, the analysis result of the image may vary with the accuracy of registration of different images and the magnitude of smoothing performed to remove noise.

The cerebral cortex has a very complicated structure in which furrows are repeated like waves. The volume based analyzing method cannot completely reflect the complicated structure of the cerebral cortex. In addition, in the smoothing performed to remove the noise of the image and to improve the reliability of statistics, since the values of different tissues of a target object are averaged in volume based three-dimensional smoothing, a partial volume effect may be induced.

For example, the diffusion MRI may be used for detecting a change in the microtexture of the cerebral cortex. The change in the microtexture of the cerebral cortex may vary with the position of the voxel included in the image obtained by photographing the target object.

The cerebral cortex includes a gray matter (GM) region. For example, in a voxel of a part adjacent to the white matter (WM) in the brain, a value including not only the change in the microtexture of the cerebral cortex but also a change in the microtexture of the WM may be represented. In addition, in a voxel of a part adjacent to the cerebrospinal fluid (CSF), a value including not only the change in the microtexture of the cerebral cortex but also a change in the microtexture of the CSF may be represented.

In general, since there are no changes or small changes in the microtextures of the WM and the CSF, when the magnitude of smoothing increases, the measured value of the change in the microtexture of the cerebral cortex is affected so that a smaller value than the actual change in the microtexture of the cerebral cortex may be obtained.

In the VBM analysis, the partial volume effect may be obtained by the image registration of different images, the magnitude of smoothing, and the position of a voxel.

Meanwhile, in the surface based analyzing method, a surface image of a target object may be generated by structural MRI for identifying the structure of the target object, and the structure of the furrows of the surface image is used during image registration so that the performance of image registration of different images may be improved.

That is, an interface between the WM and the GM region positioned in an internal part of the cerebral cortex and an interface between the CSF and the GM region positioned in an external part of the cerebral cortex are accurately divided and points corresponding to the internal interface and the external interface are found so that an intermediate interface may be generated along a path formed of the corresponding points. The intermediate interface may be included in the GM region. As used herein, an interface is an actual or hypothetical surface dividing regions or belonging to a region or structure.

Since the surface image including the intermediate interface effectively reflects the folding structure of the cerebral cortex, the microscopic information and the macroscopic information of the cerebral cortex may be integrally analyzed.

The surface image may include an image that represents the WM structure and an image that represents the GM structure. When the target object is a human brain, in general, the surface image of each of right and left brains may consist of 81,920 triangular meshes. The MD information of the target object may be mapped onto the vertices of the triangular meshes of the generated surface image.

In addition, in the prior art, during photographing using the diffusion MRI, an image including geometric distortion information is additionally obtained, the geometric distortion phenomenon of the diffusion MRI is corrected using the obtained additional image, and registration of the images of the structural MRI and the diffusion MRI is performed. In the prior art, image information of a target object is not accurately mapped onto the interface of the target object.

According to the exemplary embodiment of the present invention, image information of a target object may be accurately mapped onto the interface of the target object without obtaining an additional image such as an image including geometric distortion information.

FIG. 1 shows an example of a surface based image analyzing method in the prior art.

In FIG. 1, for example, an image 100 obtained by performing registration of the images of the diffusion MRI and the structural MRI of a target object in the prior art is illustrated. As illustrated in FIG. 1, an interface 300 of the target object in the diffusion MRI may not coincide with an interface 200 of the target object in the structural MRI.

For example, as illustrated in a block 500 of an image 400 obtained by enlarging a predetermined part of the registered image 100, the interface 300 of the diffusion MRI may not coincide with the interface 200 of the structural MRI.

Such non-coincidence may cause an error when image information of a voxel included in the image of the target object is mapped onto the surface of the target object. For example, when image information of the gray matter (GM) region of the cerebrum is to be mapped onto the interface of the GM region of the target object, due to the above-described non-coincidence between the interfaces, image information of CSF positioned further outside of the GM region of the cerebrum may be mapped onto the interface of the GM region of the target object.

Therefore, according to the present invention, a method and an apparatus for improving the accuracy and reliability of mapping by detecting the accurate interface of the target object using the image information and distance information of the target object and by mapping the image information corresponding to the detected interface onto the detected interface are provided.

Figure 2:
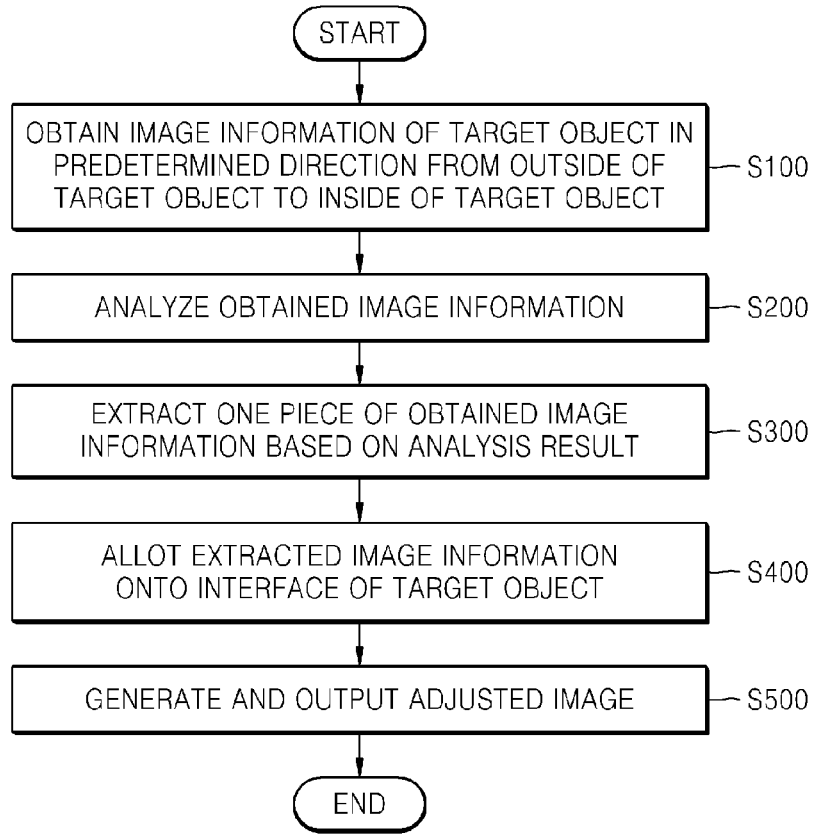
FIG. 2 is a flowchart illustrating a method of mapping image information of a target object onto an interface of the target object in magnetic resonance imaging (MRI) according to an exemplary embodiment of the present invention.

FIG. 2 is a flowchart illustrating a method of mapping image information of a target object onto an interface of the target object in magnetic resonance imaging (MRI) according to the exemplary embodiment of the present invention.

A method of mapping image information of a target object onto an interface of the target object in MRI according to the exemplary embodiment of the present invention may include a step S100 of obtaining the image information of the target object in a predetermined direction from the outside of the target object to the inside of the target object, a step S200 of analyzing the obtained image information, a step S300 of extracting one piece of the obtained image information, and a step S400 of allotting the extracted image information onto the interface of the target object. Using the allotted image information, the interface in the image obtained from MRI is then adjusted to move the interface in the image to a more accurate location and to compensate for imaging errors, and thus to generate an adjusted image which more accurately shows the interface of the target object, and the adjusted image is output in step S500, for example, from a display such as the user interface 31 and/or the image outputting unit 36 in FIG. 11, as described below. Alternatively, the adjusted image may be output to a storage unit such as one of the storages 34, 35 or transmitted, for example, over a network to another device for display, such as a remote terminal in the same or a different facility of the MRI apparatus implementing the present invention.

As described above, the target object according to the exemplary embodiment of the present invention may include a human brain.

In addition, according to the exemplary embodiment of the present invention, the image information of the target object may be obtained in the predetermined direction from the inside of the target object to the outside of the target object.

The image information of the target object according to the exemplary embodiment of the present invention may include mean diffusivity (MD) information obtained by diffusion tensor imaging (DTI) of the target object.

DTI is one of the known analyzing techniques of MRI for quantitatively measuring the characteristics of the WM of the cerebrum and is obtained by the principle of free diffusion of water molecules that form a human body.

Diffusion of the water molecules has a directional property in which the water molecules are diffused more in a specific direction due to nerve fiber bundles included in a brain tissue. For example, in the WM of the human cerebrum, the diffusion of the water molecules is mainly oriented in a direction where nerve fibers are aligned and the diffusion of the water molecules is restricted in a direction perpendicular to the nerve fibers.

That is, the directional property of cranial nerves may be visualized using DTI. For example, the direction of the nerve fibers that form the WM of the cerebrum may be visually reconstructed.

When adjacent points having the same diffusion direction are linked to each other in an arbitrary position of the cerebrum, by using the diffusion direction, an image of similar nerve fibers to those of the actual WM of the cerebrum may be obtained.

The image obtained by MRI according to the exemplary embodiment of the present invention may include the external interface and the internal interface of the target object. When the target object is the cerebrum, the external interface may be the interface between CSF and GM and the internal interface may be the interface between the GM and the WM. For example, when the target object is the cerebrum, an image that represents a region in which the GM and the CSF of the cerebrum are divided may be generated using the external interface, and an image that represents a region in which the GM and the WM of the cerebrum are divided may be generated using the internal interface.

The predetermined direction according to the exemplary embodiment of the present invention may include a linked path between a predetermined point of the external interface and a point in the internal interface corresponding to the point of the external interface.

The image that represents the region in which the GM and the WM of the cerebrum are divided and the image that represents the region in which the GM and the CSF of the cerebrum are divided may consist of a plurality of three-dimensional points. Points of the image that represents the region in which the GM and the WM of the cerebrum are divided and points of the image that represents the region in which the GM and the CSF of the cerebrum are divided may be linked to each other, on a one to one correspondence basis, respectively. In this case, the thickness of the cerebral cortex in a selected direction may be defined by a distance between the two linked points.

Figure 3:
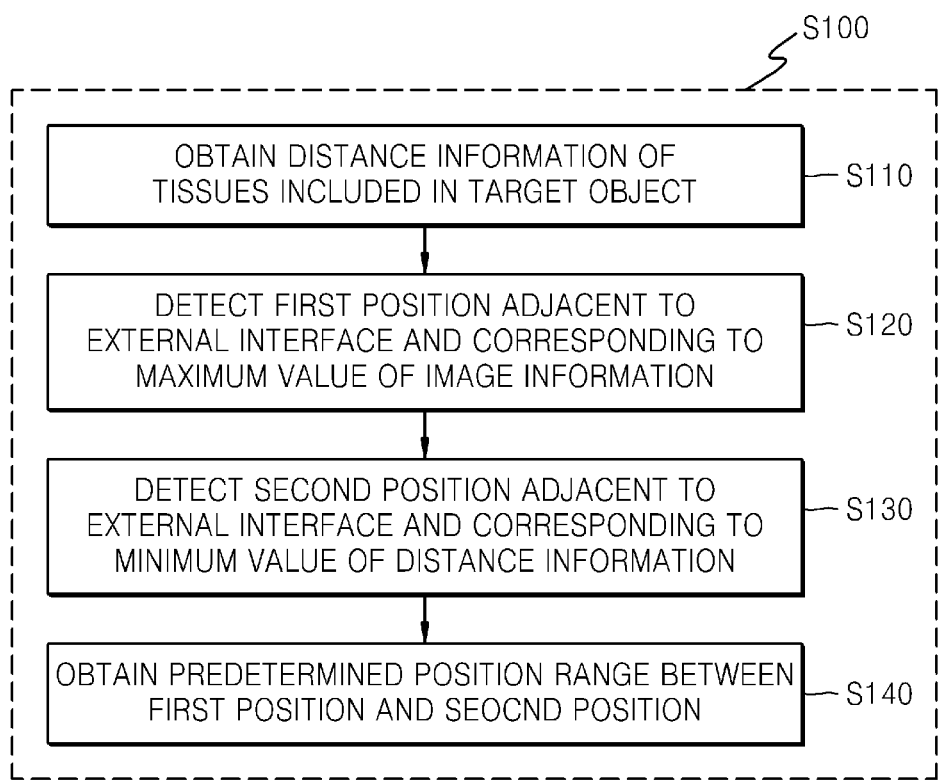
FIG. 3 is a flowchart illustrating a method of obtaining image information of the target object according to the exemplary embodiment of the present invention.

FIG. 3 is a flowchart illustrating a method of obtaining image information of a target object according to an exemplary embodiment of the present invention.

The step S100 in FIG. 2 of obtaining image information of a target object according to the exemplary embodiment of the present invention may further include a step S110 of obtaining distance information of tissues included in the target object, a step S120 of detecting a first position on a path adjacent to the external interface and corresponding to the maximum value of the image information, a step S130 of detecting a second position on a path adjacent to the external interface and corresponding to the minimum value of the distance information, and a step S140 of obtaining a predetermined position range between the first position and the second position, which will be described later with reference to FIG. 5.

The distance information according to the exemplary embodiment of the present invention may include information that represents a distance from a reference point on at least one tissue included in the target object to another tissue.

For example, the distance information may represent distances from a predetermined point of the WM of the cerebrum to the GM and the CSF of the cerebrum. For example, distances from an axon included in the WM to the GM and the CSF may be included in the distance information.

Figure 4:
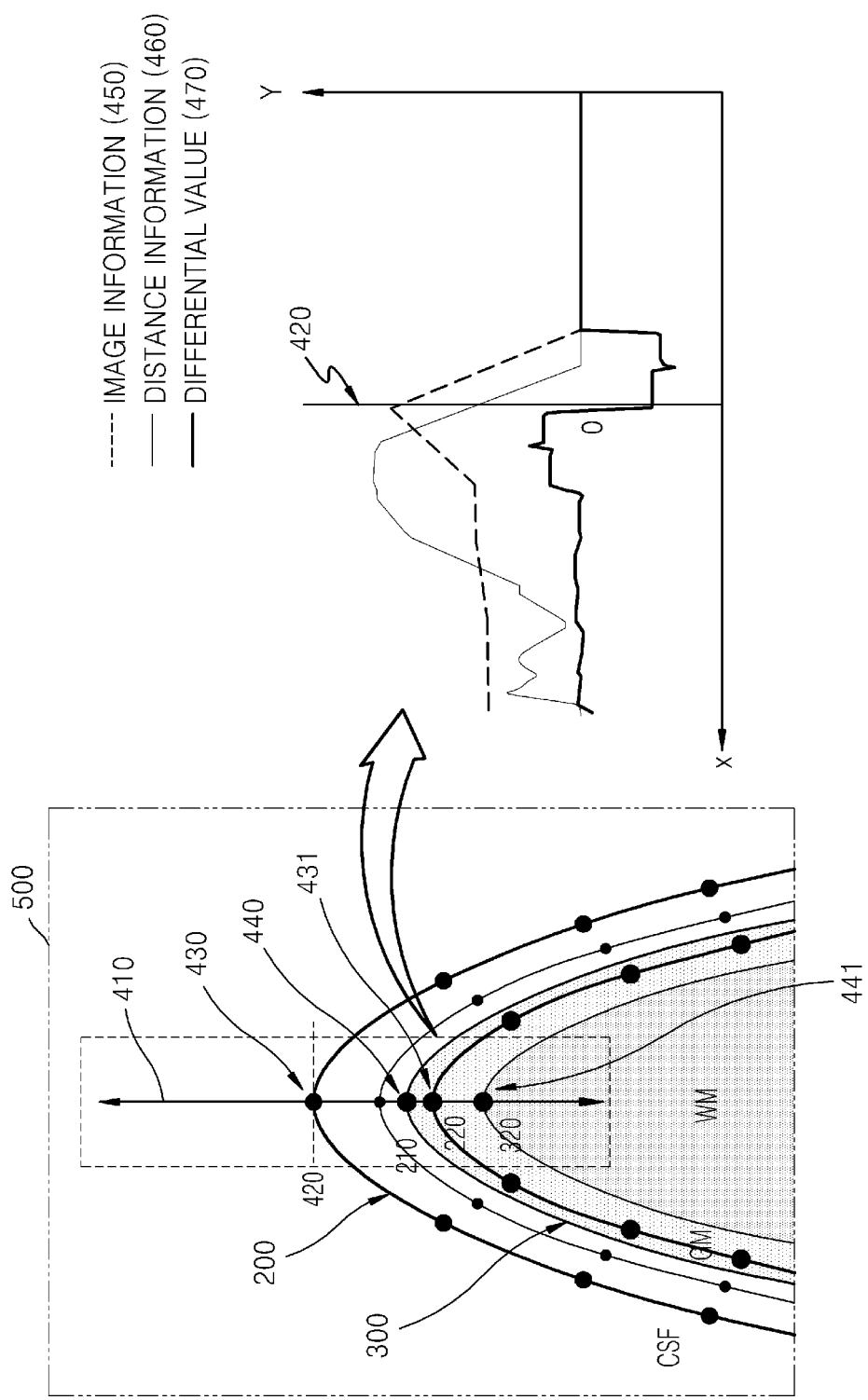
FIG. 4 illustrates an example of a method of obtaining image information and distance information of the target object according to the exemplary embodiment of the present invention.

FIG. 4 illustrates an example of a method of obtaining image information and distance information of a target object according to the exemplary embodiment of the present invention.

For convenience sake and illustrative purposes, in FIG. 4, only a portion of the block 500 of FIG. 1 is shown.

In FIG. 4, a linked path 410 between a predetermined point 430 on an external interface 200 and a point 431 on an internal interface 220 corresponding to the point 430 is illustrated. As described above, the point 430 on the external interface 200 and the point 431 on the internal interface 220 may be linked to each other, on a one to one correspondence basis. In addition, a point 440 on an actual external interface 300 of a target object may be linked to a point 441 on an actual internal interface 320 of the target object.

In the step S100 in FIG. 2, image information 450 of the target object, represented by a dashed line in FIG. 4, may be obtained in a predetermined direction 410. The image information 450 may be obtained based on a plane 420 including the predetermined point 430 on the external interface 200.

The X axis of the graph of FIG. 4 represents the path 410 toward the inside or the outside of the target object in predetermined units of length, such as units of millimeters (mm). However, the present invention is not limited to the above.

In addition, the Y axis of the graph of FIG. 4 may be differently interpreted in accordance with a predetermined parameter.

For example, the image information 450 may include MD information. In this case, the Y axis represents the values of the MD information in units of mm$^2$/sec. However, the present invention is not limited to the above.

In addition, the graph of FIG. 4 may represent distance information 460, represented by the light solid line. As described above, the distance information 460 may represent a distance from a reference point on at least one tissue included in the target object to another tissue. For example, the distance information 460 may represent the distances from the axon included in the WM to the GM and the CSF. In this case, the Y axis in FIG. 4 may be represented in predetermined units of length, such as units of mm. However, the present invention is not limited to the above.

In addition, the graph of FIG. 4 may represent the differential values 470, represented by the bold solid line, for the image information 450.

As described above, in order to accurately map the image information of the target object onto the actual interface of the target object, the image information of the target object corresponding to the external interface 200 is to be allotted onto the actual external interface 300 of the target object. Therefore, it is important to detect the actual external interface 300 of the target object.

However, as illustrated in FIG. 4, the external interface 200 obtained from the structural MRI may not coincide with the actual external interface 300 of the target object in the diffusion MRI. That is, the external interface 200 and the internal interface 220 obtained from the structural MRI may be positioned further outside of the actual external interface 300 and the actual internal interface 320 of the target object in the diffusion MRI.

In addition, the external interface 200 and the internal interface 220 obtained from the structural MRI may be positioned further inside than the actual external interface 300 and the actual internal interface 320 of the target object in the diffusion MRI.

Figure 5A:
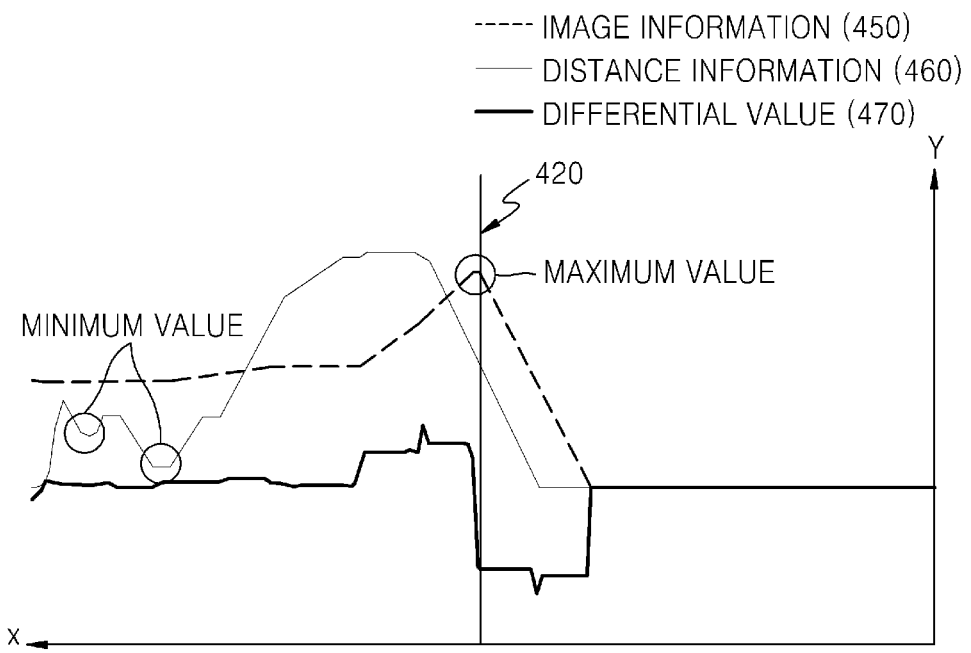
Figure 5B:
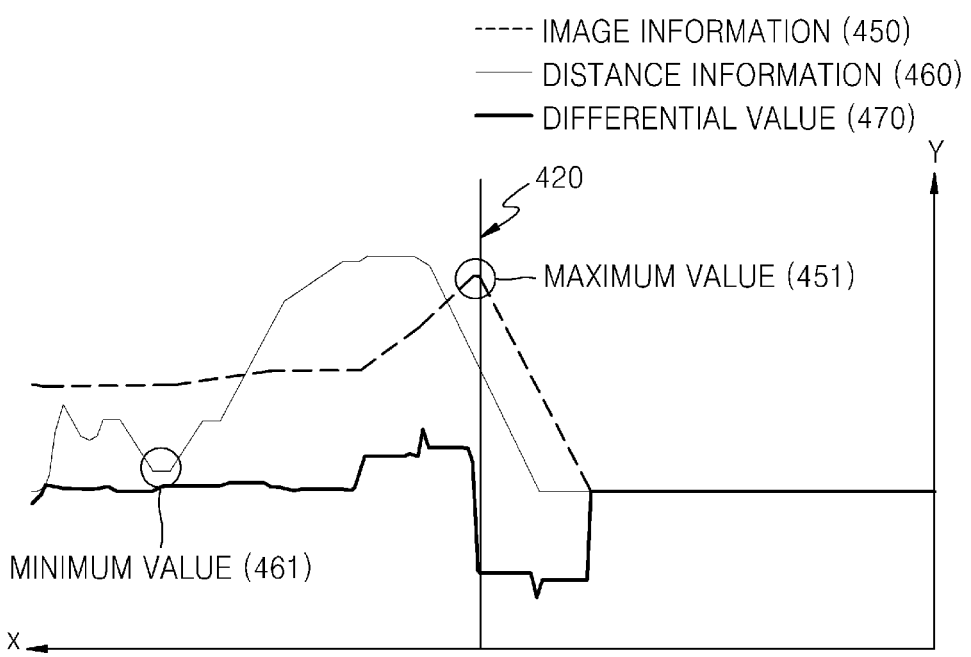

FIGS. 5A to 5C illustrate an example of a method of obtaining a predetermined position range according to the exemplary embodiment of the present invention.

In step S110 of FIG. 3, the distance information of tissues included in the target object may be obtained and the minima of the distance information may be obtained. The minima of the distance information may include the minimum values of the distance information. As illustrated in FIG. 5A, at least one minimum value may be obtained.

In addition, as illustrated in FIG. 5B, in the step S120 of FIG. 3, the first position adjacent to the external interface 200 and corresponding to the maximum value 451 of the image information 450 may be detected. The maximum of the image information may include the maximum value of the image information In addition, as illustrated in FIG. 5B, in the step S130 of FIG. 3, the second position corresponding to the minimum value 461 adjacent to the external interface 200 may be detected from the minima of the distance information 460.

As illustrated in FIG. 5C, in the step S140 of FIG. 3, a predetermined position range 510 between the first position and the second position may be obtained.

The predetermined position range 510 may be a position section in which a probability that the actual external interface 300 will exist is the highest.

Figure 6:
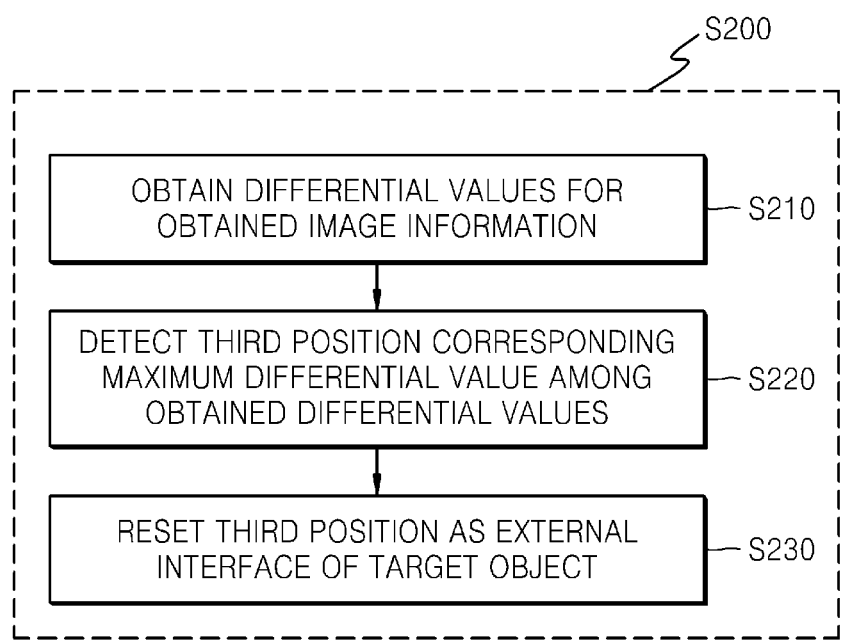
FIG. 6 is a flowchart illustrating a method of analyzing obtained image information according to the exemplary embodiment of the present invention.

FIG. 6 illustrates a flowchart illustrating a method of analyzing obtained image information according to the exemplary embodiment of the present invention.

Figure 8A:
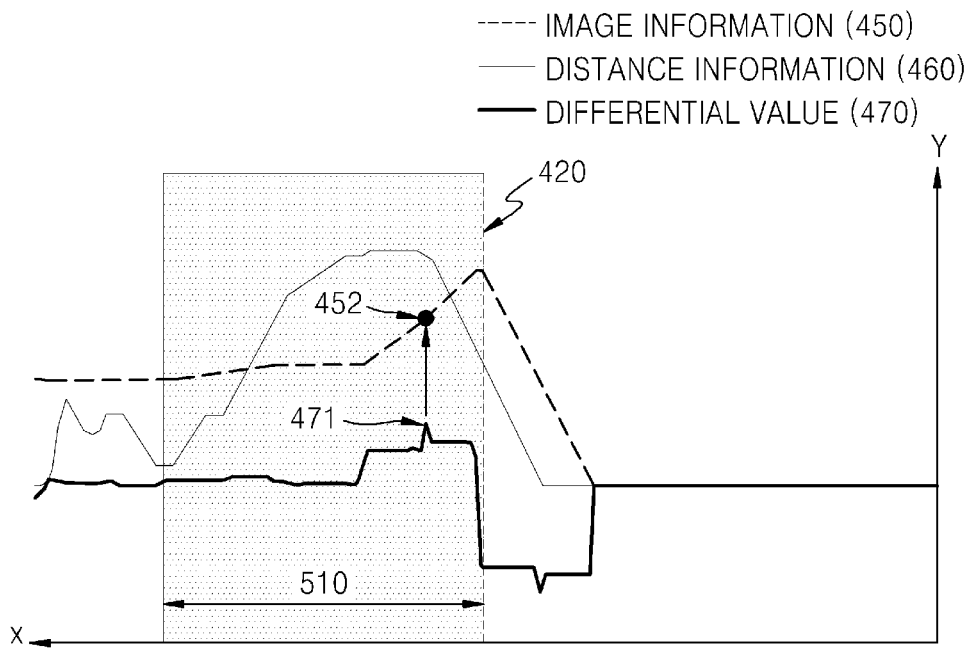
FIG. 8A illustrates an example of a method of analyzing obtained image information according to the exemplary embodiment of the present invention.

The step S200 in FIG. 2 of analyzing obtained image information according to the exemplary embodiment of the present invention may further include a step S210 of obtaining differential values for the obtained image information, a step S220 of detecting a third position on a path corresponding to the maximum differential value among the obtained differential values, and a step S230 of resetting the third position as the external interface of a target object, which will be described later with reference to FIG. 8A.

In addition, the third position according to the exemplary embodiment of the present invention may be included in the predetermined position range 510 shown in FIG. 5C.

Figure 7A:
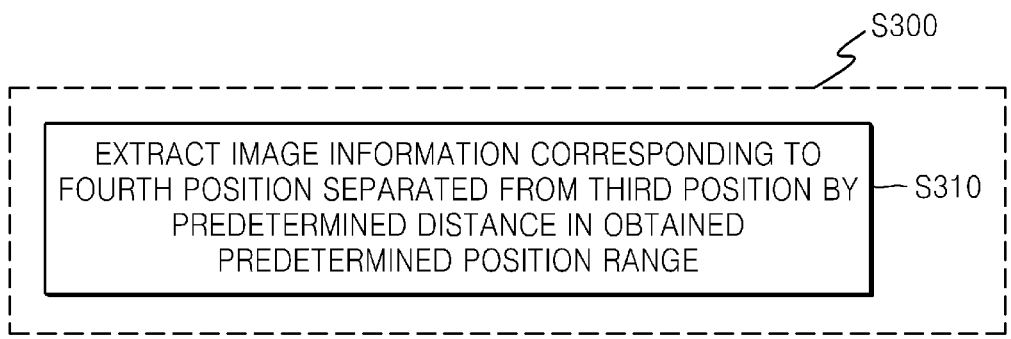
FIG. 7A is a flowchart illustrating a method of extracting one piece of obtained image information according to the exemplary embodiment of the present invention.

FIG. 7A is a flowchart illustrating a method of extracting one piece of the obtained image information according to the exemplary embodiment of the present invention.

The step S300 in FIG. 2 of extracting the one piece of the obtained image information based on the analysis result of the obtained image information according to the exemplary embodiment of the present invention may further include a step S310 of extracting image information corresponding to a fourth position separated from the third position by a predetermined distance in the predetermined position range obtained in the step S140 of FIG. 3, which will be described later with reference to FIG. 8B.

Figure 7B:
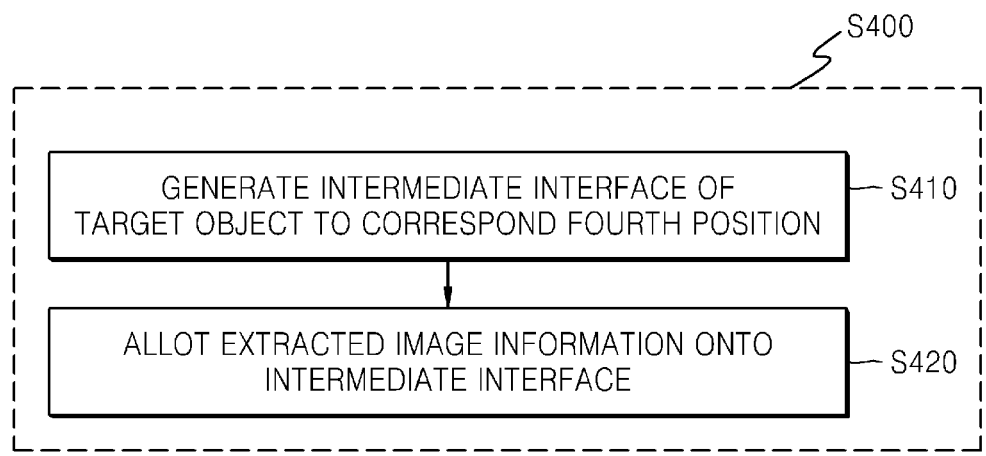
FIG. 7B is a flowchart illustrating a method of allotting extracted image information onto an interface of a target object according to the exemplary embodiment of the present invention.

FIG. 7B is a flowchart illustrating a method of allotting extracted image information to the interface of a target object according to the exemplary embodiment of the present invention.

The step S400 in FIG. 2 of allotting extracted image information to the interface of a target object according to the exemplary embodiment of the present invention may further include a step S410 of generating an intermediate interface of the target object to correspond to the fourth position and a step S420 of allotting the extracted image information onto the intermediate interface.

The intermediate interface according to the exemplary embodiment of the present invention may be an interface positioned between the reset external interface and the internal interface. For example, the intermediate interface may be the interface included in the GM region of the cerebrum.

FIG. 8A illustrates an example of a method of analyzing obtained image information according to the exemplary embodiment of the present invention. FIG. 8B illustrates an example of a method of extracting one piece of the obtained image information according to the exemplary embodiment of the present invention.

Differential values 470 may be obtained for the image information 450 obtained in the step S210 of FIG. 6. The differential values 470 may include primary differential values that represent increases in the values of the image information in accordance with increases in distances on the path 410 of FIG. 4. However, the present invention is not limited to the above. For example, in the step S210 of FIG. 6, differential values 470 may be obtained that represent changes in the image information on the Y axis in accordance with changes in distances on the X axis.

Referring again to FIG. 8A, the image information 450 of the target object may change very rapidly on the interface of the target object. Therefore, the changes in the image information 450 may be quantitatively represented by the differential values 470 and the maximum value of the differential values may be estimated as the actual interface of the target object, for example, the interfaces 300, 320 shown in FIG. 4.

Figure 8B:
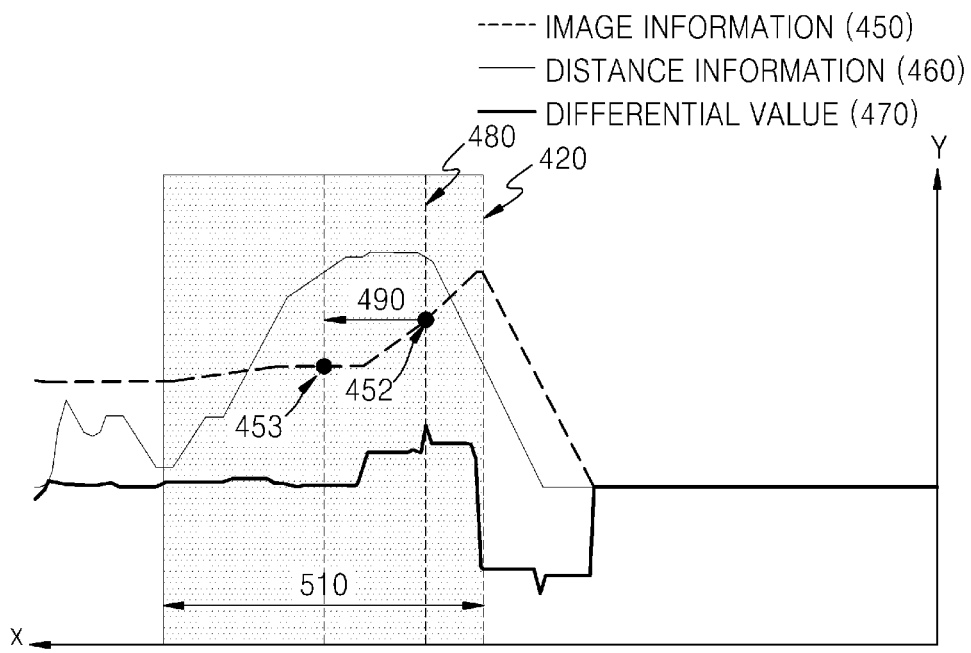
FIG. 8B illustrates an example of a method of extracting one piece of the obtained image information according to the exemplary embodiment of the present invention.

In step S220 of FIG. 6, a third position 480 shown in FIG. 8B may be detected, corresponding to the maximum differential value 471 of the obtained differential values 470 shown in FIG. 8A.

Referring to FIG. 8B, the third position 480 may be the actual external interface 300 of the target object shown in FIG. 4. In addition, for example, when the image information includes the MD information, a value 452 of the image information corresponding to the maximum differential value 471 may correspond to a MD value on the actual external interface 300 of the target object.

In step S230 of FIG. 6, the third position 480 shown in FIG. 8B may be reset as the external interface of the target object. For example, the third position 480 may be estimated as the actual external interface 300 of the target object shown in FIG. 4. The third position 480 may be preferably estimated as a predetermined point 440 on the actual external interface 300 of the target object, shown in FIG. 4.

For example, the predetermined point 440 on the actual external interface 300 in FIG. 4 may refer to the vertex of each of the triangular meshes that form the surface image of the target object. That is, the predetermined point 440 on the actual external interface 300 may be the vertex at which the plurality of triangular meshes that form the surface image of the target object are connected to each other.

In particular, the external interface 200 obtained from the structural MRI may not coincide with the actual external interface 300 of the target object. Therefore, in order to correlate the image information obtained from the external interface 200 to the actual external interface 300, it is necessary to reset the position of the external interface 200 shown in FIG. 4.

For example, non-coincidence between the interfaces (for example, the interfaces 200 and 300 in FIG. 4) may be reduced by resetting the position of the external interface of the target object related to the image information from the position 420 to the position 480 along the X axis. It is possible to improve a coincidence rate between the interfaces (for example, the interfaces 200 and 300 in FIG. 4) and to improve reliability of the image information of the target object by resetting the external interface 200 obtained by the structural MRI.

As illustrated in FIGS. 8A and 8B, the third position 480 may be included in the predetermined position range 510.

Referring to FIGS. 7A and 8B, the step S300 in FIG. 2 of extracting one piece of the obtained image information based on the analysis result of the image information may further include the step of extracting image information 453 shown in FIG. 8B corresponding to the fourth position separated from the third position 480 by a predetermined distance 490 in the predetermined position range 510.

The predetermined distance 490 according to the exemplary embodiment of the present invention may include an arbitrary distance between the external interface 200 and the internal interface 220. For example, the predetermined distance 490 may include a distance equal to half (½) of a distance between the external interface 200 and the internal interface 220. As described above, the predetermined point 430 on the external interface 200 and the predetermined point 431 on the internal interface 220, shown in FIG. 4, may be connected to each other. A distance between the point 430 and the point 431 on the target object may be previously stored in a storage unit of an apparatus to be described later with reference to FIG. 9.

When the target object is the cerebrum, the thickness of the cerebral cortex that may be represented by the distance between the point on the external interface and the point on the internal interface may be previously stored as numerical values representing the corresponding points.

For example, image information at a point moved toward the WM by half the thickness of the cerebral cortex formed of the GM of the cerebrum may be extracted. The predetermined distance 490 of FIG. 8B may be a distance from the reset external interface 480 to the point moved toward the WM by half the thickness of the cerebral cortex. Here, the thickness of the cerebral cortex may be previously stored as described above.

The image information 453 extracted according to the exemplary embodiment of the present invention may be included in the predetermined position range 510 as illustrated in FIG. 8B.

Referring back to FIG. 7B, the step S400 of FIG. 2 of allotting the extracted image information onto the interface of the target object further includes the step S410 of generating the intermediate interface of the target object to correspond to the fourth position and the step S420 of allotting the extracted image information onto the intermediate interface.

The intermediate interface according to the exemplary embodiment of the present invention may be positioned between the reset external interface and the internal interface.

The fourth position according to the exemplary embodiment of the present invention may be positioned in the predetermined direction 410 corresponding to the point 453 of FIG. 8B. Since the image information 450 is obtained in the predetermined direction 410, the position corresponding to the point 453 may be obtained from the image information 450. The position corresponding to the point 453 may be preferably positioned between the external interface 300 and the internal interface 320. For example, when the target object is the cerebrum, the position corresponding to the point 453 may be positioned in the GM region. That is, the intermediate interface of the target object generated in the step S410 of FIG. 7B may be an arbitrary interface included in the GM region.

The image information extracted in the step S420 of FIG. 7B may be allotted onto the intermediate interface. For example, the image information 453 extracted in the position corresponding to the distance 490 moved by half of the thickness of the cerebral cortex in step S310 may be allotted onto the interface of the GM region having a thickness of half of that of the cerebral cortex. The extracted image information 453 may be preferably allotted onto the vertex of each of the triangular meshes that form the interface of the GM region having the thickness of half of that of the cerebral cortex.

As described above, according to the exemplary embodiment of the present invention, image information is analyzed in a predetermined position range to detect the actual interface of a target object and the value of image information in a position separated from the detected interface by a predetermined distance, and such analyzed image information is obtained to allot the obtained value of the image information onto the interface corresponding to the corresponding position, and so to adjust the interface in the image obtained from MRI using the allotted image information. Therefore, the image information may be accurately mapped onto the target object in comparison with the prior art.

Figure 9:
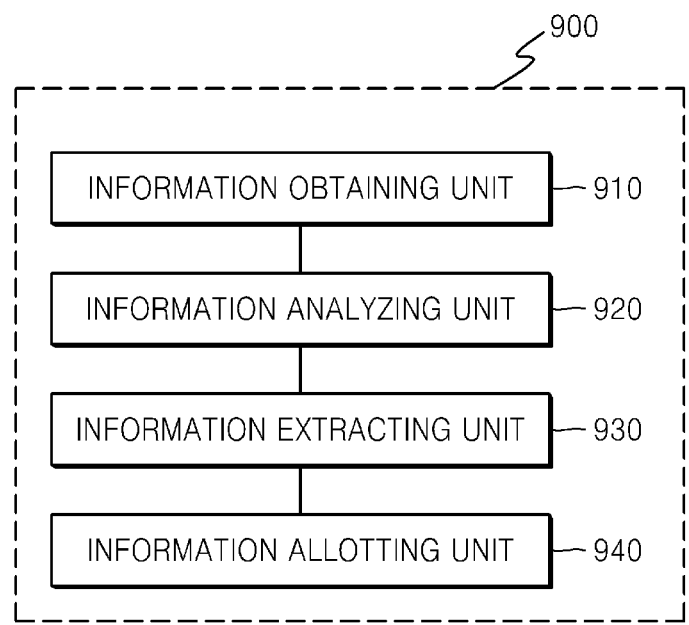
FIG. 9 illustrates an apparatus for mapping image information of the target object onto the interface of a target object in MRI according to the exemplary embodiment of the present invention.

FIG. 9 illustrates an apparatus for mapping image information of a target object onto the interface of the target object in MRI according to the exemplary embodiment of the present invention.

The apparatus 900 for mapping image information of a target object to the interface of the target object in MRI according to the exemplary embodiment of the present invention may include an information obtaining unit 910 for obtaining the image information of the target object in a predetermined direction from the outside of the target object to the inside of the target object, an information analyzing unit 920 for analyzing the obtained image information, an information extracting unit 930 for extracting one piece of the obtained image information based on the analysis result, and an information allotting unit 940 for allotting the extracted image information onto the interface of the target object.

The image information of the target object according to the exemplary embodiment of the present invention may include MD information obtained from DTI of the target object. Accordingly, the information obtaining unit 910 may be connected to or may include an MRI apparatus known in the art for obtaining such MRI information, including the MD information obtained from DTI of the target object.

Figure 11:
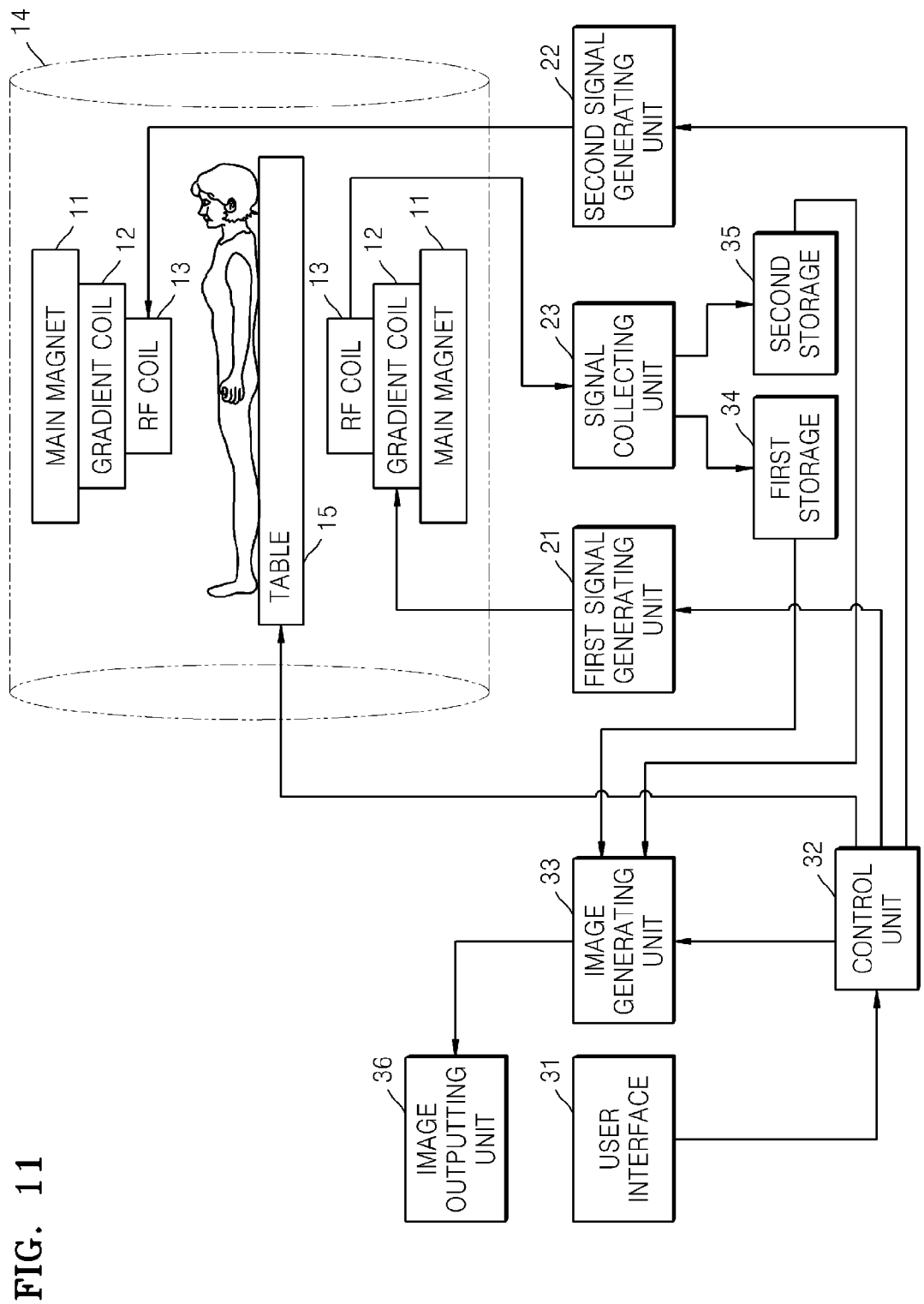
FIG. 11 illustrates an MRI apparatus implementing the apparatus of FIGS. 9-10 according to the exemplary embodiment of the present invention.

In the exemplary embodiment of the present invention, as shown in FIG. 11, the MRI apparatus may include a magnet assembly 14 in which the target object, such as the patient or a portion of the patient, is positioned while on a table 15. At least one main magnet 11, at least one gradient coil 12, and at least one RF coil 13 operate with a first signal generating unit 21, a second signal generating unit 22, a signal collecting unit 23, and at least one of a first storage 34 and a second storage 35, as well as with a user interface 31, a control unit 32, an image generating unit 33, and an image outputting unit 36 to obtain magnetic resonance images in a manner known in the art, and to which the apparatus 900 and its components 910-940 are connected or included to perform the operations of the present invention. In addition, the user interface 31 and/or the image outputting unit 36 may include a display for displaying an image with an adjusted interface obtained from the operation of the present invention.

The image obtained from MRI according to the exemplary embodiment of the present invention may include the external interface and the internal interface of the target object.

The predetermined direction according to the exemplary embodiment of the present invention may include a path between a predetermined point on the external interface and a point on the internal interface corresponding to the predetermined point on the external interface, as described herein with reference to FIG. 4.

Figure 10:
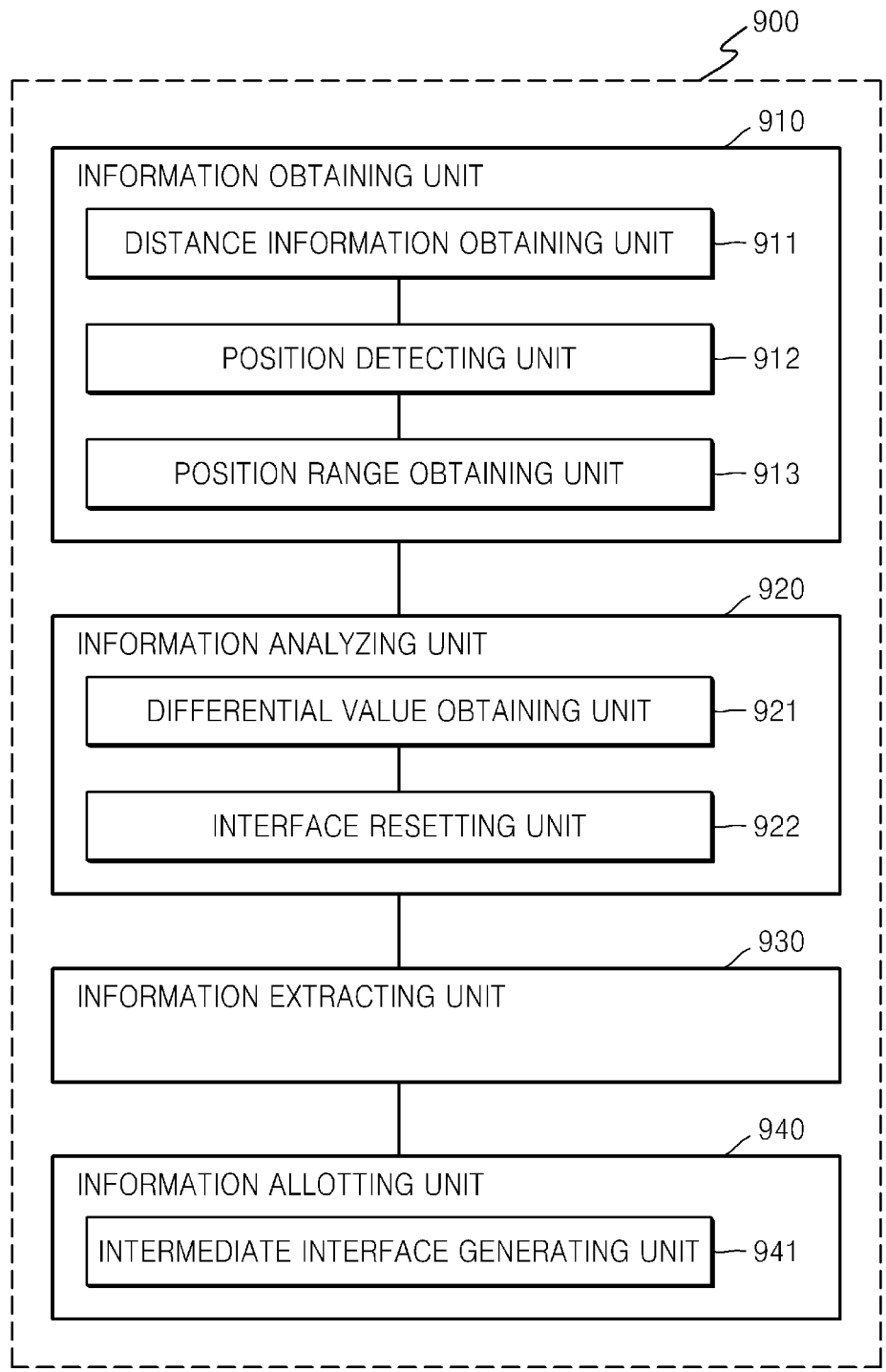
FIG. 10 illustrates an apparatus for mapping image information of the target object onto an interface of the target object in MRI according to the exemplary embodiment of the present invention, showing the apparatus in FIG. 9 in greater detail.

FIG. 10 illustrates an apparatus for mapping image information of a target object onto the interface of the target object in MRI according to the exemplary embodiment of the present invention, showing the apparatus 900 and its components 910-940 in FIG. 9 in greater detail.

The information obtaining unit 910 according to exemplary embodiment of the present invention may further include a distance information obtaining unit 911, a position detecting unit 912, and a position range obtaining unit 913.

The distance information obtaining unit 911 may obtain distance information of tissues included in the target object.

The position detecting unit 912 may detect a first position on a path adjacent to the external interface and corresponding to the maximum value of the image information and a second position on a path adjacent to the external interface and corresponding to the minimum value of the distance information.

The position range obtaining unit 913 may obtain a predetermined position range between the first position and the second position.

The distance information according to the exemplary embodiment of the present invention may represent a distance from a reference point on at least one tissue included in the target object to another tissue.

The information analyzing unit 920 according to the exemplary embodiment of the present invention may further include a differential value obtaining unit 921 and an interface resetting unit 922.

The differential value obtaining unit 921 may obtain differential values for obtained image information.

The interface resetting unit 922 may reset a third position on a path corresponding to the maximum differential value among obtained differential values as the external interface of the target object.

The third position may be included in the predetermined position range 510, shown in FIGS. 5C and 8A-8B. The third position may be detected by the position detecting unit 912 included in the information obtaining unit 910.

The information extracting unit 930 may extract image information corresponding to a fourth position separated from the third position by a predetermined distance in the predetermined position range.

In addition, the information extracting unit 930 is connected to the storage unit, such as one of the storages 34, 35 in FIG. 11, including information on the distance between the external interface 200 and the internal interface 220 as described above to obtain information on the distance between the interfaces. That is, the information extracting unit 930 may obtain the information stored in the storage unit on the distance between the external interface 200 and the internal interface 220, with the information retrieved from the storage unit and may determine a predetermined distance by which separation from the reset interface is to be performed using the obtained distance information.

For example, referring to FIG. 4, when the target object is the cerebral cortex, the distance from the predetermined point 430 to the point 431 connected to the point 430 may be the thickness of the cerebral cortex for the corresponding points 430 and 431. For example, the information extracting unit 930 may determine the predetermined distance to be one half, one third, two thirds, one fourth, or any other factor of the thickness of the cerebral cortex by which separation from the reset interface is to be performed.

That is, the information extracting unit 930 may extract the value of the image information in the position separated from the reset interface by the above-described predetermined distance.

The information allotting unit 940 may further include an intermediate interface generating unit 941 for generating an intermediate interface of the target object to correspond to the fourth position. The information allotting unit 940 may allot the extracted image information onto the intermediate interface. The intermediate interface may be positioned between the reset external interface and the internal interface.

The intermediate interface generating unit 941 then generates an MR image having the accurate interface of the target object using the image information and distance information of the target object and by mapping the image information corresponding to the detected interface onto the detected interface. The apparatus 900 then outputs the generated MR image having the accurate interface, for example, to a display of the user interface 31 or the image outputting unit 36 of FIG. 11.

The content of the above-described method may be applied to the apparatus according to the exemplary embodiment of the present invention. Therefore, in the apparatus, description of the same content as that of the above-described method is omitted.

On the other hand, the above-described exemplary embodiments of the present invention may be prepared by a program that may be executed by a computer and may be implemented by a general purpose digital computer that operates the program using computer readable recording media. The computer readable recording media include magnetic storage media (for example, a read-only memory (ROM), a floppy disk, and a hard disk, etc.), optical reading media (for example, a CD-ROM and a digital versatile disk (DVD), etc.), and carrier wave (for example, transmission through the Internet).

The above-described apparatus and methods according to the present invention can be implemented in hardware or firmware, or via the execution of software or computer code, or combinations thereof. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of mapping image information of a target object onto an interface of the target object in magnetic resonance imaging (MRI), the method comprising:
   obtaining the image information of the target object in a path connected between a predetermined point on an external interface of the target object and a point on an internal interface of the target object corresponding to the predetermined point on the external interface of the target object;
   analyzing the obtained image information;
   extracting one piece of the obtained image information based on the analysis result;
   allotting the extracted image information onto the interface of the target object to adjust the interface in an MRI image of the target object; and
   generating and displaying the MRI image of the target object with the adjusted interface,
   wherein obtaining the image information of the target object comprises,
   obtaining distance information of tissues included in the target object;
   detecting a first position on the path adjacent to the external interface and corresponding to a maximum value of the image information and a second position on the path adjacent to the external interface and corresponding to a minimum value of the distance information; and
   obtaining a predetermined position range between the first position and the second position.

2. The method as claimed in claim 1, wherein the image information of the target object comprises mean diffusivity (MD) information obtained from diffusion tensor imaging (DTI) of the target object.

3. The method as claimed in claim 1, wherein the distance information
   represents a distance from a reference point on at least one tissue included in the target object to another tissue.

4. The method as claimed in claim 1, wherein analyzing the obtained image information comprises:
   obtaining differential values for the obtained image information;
   detecting a third position on the path corresponding to a maximum differential value among the obtained differential values; and
   resetting the third position as the external interface of the target object; and
   wherein the third position is included in the predetermined position range.

5. The method as claimed in claim 3, wherein extracting one piece of the obtained image information based on the analysis result comprises extracting image information corresponding to a fourth position separated from the third position by a predetermined distance in the predetermined position range.

6. The method as claimed in claim 5, wherein allotting the extracted image information onto the interface of the target object comprises:
   generating an intermediate interface of the target object to correspond to the fourth position; and
   allotting the extracted image information onto the intermediate interface; and
   wherein the intermediate interface is positioned between the reset external interface and the internal interface.

7. An apparatus for mapping image information of a target object onto an interface of the target object in magnetic resonance imaging (MRI), the apparatus comprising:
   an information obtaining unit for obtaining the image information of the target object in a path connected between a predetermined point on an external interface of the target object and a point on an internal interface of the target object corresponding to the predetermined point on the external interface of the target object;
   an information analyzing unit for analyzing the obtained image information;

an information extracting unit for extracting one piece of the obtained image information based on the analysis result;

an information allotting unit for allotting the extracted image information onto the interface of the target object to adjust the interface in an MRI image of the target object; and a display for generating and displaying the MRI image of the target object with the adjusted interface, wherein the information obtaining unit comprises, a distance information obtaining unit for obtaining distance information of tissues included in the target object;

a position detecting unit for detecting a first position on the path adjacent to the external interface and corresponding to a maximum value of the image information and a second position on the path adjacent to the external interface and corresponding to a minimum value of the distance information; and a position range obtaining unit for obtaining a predetermined position range between the first position and the second position.

8. The apparatus as claimed in claim 7, wherein the image information of the target object comprises mean diffusivity (MD) information obtained from diffusion tensor imaging (DTI) of the target object.

9. The apparatus as claimed in claim 7, wherein the distance information
represents a distance from a reference point on at least one tissue included in the target object to another tissue.

10. The apparatus as claimed in claim 7, wherein the information analyzing unit comprises:
a differential value obtaining unit for obtaining differential values for the obtained image information; and
an interface resetting unit for resetting a third position on the path corresponding to a maximum differential value among the obtained differential values as the external interface of the target object; and
wherein the third position is included in the predetermined position range and is detected by the position detecting unit.

11. The apparatus as claimed in claim 9, wherein the information extracting unit extracts image information corresponding to a fourth position separated from the third position by a predetermined distance in the predetermined position range.

12. The apparatus as claimed in claim 11,
wherein the information allotting unit further comprises an intermediate interface generating unit for generating an intermediate interface of the target object to correspond to the fourth position;
wherein the information allotting unit allots the extracted image information onto the intermediate interface; and
wherein the intermediate interface is positioned between the reset external interface and the internal interface.

13. A non-transitory computer readable recording medium in which a program for executing a method is recorded thereon, the program when accessed by a processor causes the processor to execute:
obtaining image information of a target object in a path connected between a predetermined point on an external interface of the target object and a point on an internal interface of the target object corresponding to the predetermined point on the external interface of the target object;
analyzing the obtained image information;
extracting one piece of the obtained image information based on the analysis result;
allotting the extracted image information onto an interface of the target object to adjust the interface in a magnetic resonance imaging (MRI) image of the target object; and
generating and displaying the MRI image of the target object with the adjusted interface,
wherein obtaining the image information of the target object comprises,
obtaining distance information of tissues included in the target object;
detecting a first position on the path adjacent to the external interface and corresponding to a maximum value of the image information and a second position on the path adjacent to the external interface and corresponding to a minimum value of the distance information; and
obtaining a predetermined position range between the first position and the second position.

* * * * *